US012273966B2

(12) United States Patent
Kwon

(10) Patent No.: US 12,273,966 B2
(45) Date of Patent: Apr. 8, 2025

(54) SURFACE TYPE HEATING ELEMENT HAVING CONTROLLED OXIDE LAYER AND MANUFACTURING METHOD THEREOF

(71) Applicant: LG ELECTRONICS INC., Seoul (KR)

(72) Inventor: Yooseok Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/238,994

(22) Filed: Aug. 28, 2023

(65) Prior Publication Data

US 2023/0403765 A1 Dec. 14, 2023

Related U.S. Application Data

(63) Continuation of application No. 16/898,987, filed on Jun. 11, 2020, now Pat. No. 11,832,358.

(30) Foreign Application Priority Data

Jun. 12, 2019 (KR) ........................ 10-2019-0069422

(51) Int. Cl.
*H05B 3/74* (2006.01)
*H05B 3/00* (2006.01)
*H05B 3/12* (2006.01)
*H05B 3/14* (2006.01)
(Continued)

(52) U.S. Cl.
CPC ............. *H05B 3/74* (2013.01); *H05B 3/0071* (2013.01); *H05B 3/12* (2013.01); *H05B 3/141* (2013.01); *H05B 3/18* (2013.01); *H05B 3/283* (2013.01); *H05B 2203/002* (2013.01); *H05B 2203/013* (2013.01)

(58) Field of Classification Search
CPC .......... H05B 3/0038; H05B 3/10; H05B 3/12; H05B 3/141; H05B 3/18; H05B 3/26; H05B 3/262; H05B 3/265; H05B 3/28; H05B 3/283; H05B 3/74; H05B 2203/002; H05B 2203/013; B22F 9/24; B22F 1/142; B22F 2302/25; B22F 2304/058; B22F 2202/03; C01B 13/363; C01G 39/02; C01G 41/00; C01G 41/02; C01P 2002/54; C01P 2004/03; C01P 2006/80; C01P 2004/61
USPC .... 219/202, 209, 217, 212, 211, 443.1, 528, 219/553, 552, 541, 538, 529
See application file for complete search history.

(56) References Cited

U.S. PATENT DOCUMENTS 5,227,231 A 7/1993 Yoshizaki et al.
6,999,049 B2 2/2006 Hirota
10,904,952 B2 1/2021 Jeong et al.
(Continued)

FOREIGN PATENT DOCUMENTS

CN 113073286 A 7/2021
EP 0 300 685 A2 1/1989
(Continued)

*Primary Examiner* — Phuong T Nguyen
(74) *Attorney, Agent, or Firm* — Birch, Stewart, Kolasch & Birch, LLP

(57) ABSTRACT

Discussed is a surface type heating element including a surface type heating element layer including NiCr alloy powders, necks between powder particles of the NiCr alloy powders, and passivation oxide layers formed on a surface of the NiCr alloy powders.

10 Claims, 12 Drawing Sheets

(51) Int. Cl.

| | |
|---|---|
| ***H05B 3/18*** | (2006.01) |
| ***H05B 3/28*** | (2006.01) |

(56) References Cited

U.S. PATENT DOCUMENTS

| | | | | |
|---|---|---|---|---|
| 2002/0055021 | A1 | 5/2002 | Niwa | |
| 2003/0098299 | A1 | 5/2003 | Hiramatsu et al. | |
| 2006/0102613 | A1 | 5/2006 | Kuibira et al. | |
| 2008/0017627 | A1 | 1/2008 | Iwata et al. | |
| 2008/0105853 | A1 | 5/2008 | Ueda et al. | |
| 2010/0294300 | A1 | 11/2010 | Takenouchi | |
| 2012/0217234 | A1 | 8/2012 | Abbott et al. | |
| 2019/0022929 | A1* | 1/2019 | Chaffins .................... | H05K 1/16 |
| 2019/0037646 | A1* | 1/2019 | Chaffins .................... | H05K 1/16 |

FOREIGN PATENT DOCUMENTS

| | | | |
|---|---|---|---|
| EP | 1 942 004 | A2 | 7/2008 |
| EP | 3751959 | A1 | 12/2020 |
| JP | 56-11873 | A | 2/1981 |
| JP | 4-370901 | A | 12/1992 |
| JP | 2009-500521 | A | 1/2009 |
| KR | 2002-0079155 | A | 10/2002 |
| KR | 2003-0022263 | A | 3/2003 |
| KR | 10-1637122 | B1 | 7/2016 |
| KR | 10-2017-0066078 | A | 6/2017 |
| KR | 10-2018-0096414 | A | 8/2018 |
| WO | WO 2011/156809 | A2 | 12/2011 |

* cited by examiner

ADHESIVE STRENGH (N)

SURFACE TYPE HEATING ELEMENT HAVING CONTROLLED OXIDE LAYER AND MANUFACTURING METHOD THEREOF

CROSS-REFERENCE TO RELATED APPLICATION

This application is a Continuation of U.S. patent application Ser. No. 16/898,987, filed on Jun. 11, 2020, which claims priority to Korean Patent Application No. 10-2019-069422, filed in the Republic of Korea on Jun. 12, 2019, the entire contents of which are hereby expressly incorporated by reference into the present application.

BACKGROUND

1. Field of the Invention

The present disclosure relates to a surface type heating element which generates heat using electricity in the field of heating devices such as electric ranges and a method of manufacturing the surface type heating element.

2. Discussion of the Related Art

Cooktops used as household or commercial cooking appliances are cooking appliances that heat food contained in a container placed on the upper surface of the cooktop by heating the container.

Cooktops in the form of a gas stove which generate a flame using gas generate toxic gases and the like during the combustion process of the gas. Toxic gases not only directly cause adverse effects on the health of the cooker but also cause the pollution of indoor air. In addition, the cooktops in the form of a gas stove require a ventilation system for eliminating toxic gases or contaminated air, resulting in additional economic costs.

In recent years, in order to replace the cooktops in the form of a gas stove, cooktops in the form of an electric range including a surface type heating element which generate heat by applying an electric current have been frequently used.

As the surface type heating element, a metal heating element made by etching a metal thin plate containing iron, nickel, silver, or platinum or a non-metal heating element containing silicon carbide, zirconia, or carbon is currently being used.

Among the surface type heating elements, the metal heating elements are vulnerable to heat when continuously exposed to high temperature, and the non-metal heating elements are not easily manufactured and tend to be broken. To solve the above problems, surface type heating elements manufactured by firing metals, metal oxides, ceramic materials, and or like at high temperature for a long time have been used in recent years.

The surface type heating elements for firing include, as a main component, metal components having a relatively low melting point compared to oxides or ceramics. Most of the heating elements including metals having a low melting point have a relatively low operation temperature of about 400° C. due to the limitation on a melting point, and thus it is difficult to use the heating elements at a high cooking temperature. Furthermore, existing heating elements including metals having a low melting point can adversely affect the reliability of a product due to the elution of the metal component having a low melting point during use of a cooktop.

On the other hand, among components having a high melting point, metal oxides or ceramic materials have low fracture toughness due to inherent embrittlement of the materials themselves. Furthermore, some components among the metal oxides and ceramic materials have a relatively high coefficient of thermal expansion (CTE) compared to other ceramic materials. Their low fracture toughness and high CTE decrease the adhesion between a surface type heating element and a substrate in a cooktop and thus ultimately act as a direct cause of decreasing the lifetime of a cooktop product.

Therefore, there is a demand for a surface type heating element which does not allow the elution of the material at high temperature, has electrical resistivity that enables a stable output, and furthermore, exhibits high fracture toughness, a low CTE, and excellent adhesion to a substrate and/or an insulating layer thereunder.

Meanwhile, among components constituting a surface type heating element, components having a high melting point, such as some metals, metal oxides, or ceramics, are mainly thermally fired to manufacture a surface type heating element, and the manufacturing process such as thermal firing involves material and process constraints.

Specifically, in order to fire the components having a high melting point, first, a substrate material has to be limited to a material having a high melting point to withstand a high-temperature firing process. This acts as a big limitation in designing a cooktop product to which the surface type heating element is applied.

In addition, the thermal firing (or sintering) of the components having a high melting point mainly requires a long process time and high temperature. In particular, when the component to be sintered is a metal, oxidation of the metal component during the thermal firing process is inevitable. When the metal component is oxidized during the sintering process, the electrical resistivity of the surface type heating element is increased, resulting in a decrease in output of a cooktop using the surface type heating element. On the other hand, when oxidation of the metal component is prevented by controlling the atmosphere during the firing process, the adhesive strength between a surface type heating element layer and a substrate and/or an insulating layer thereunder is significantly decreased, and thus lifetime and reliability are significantly decreased, and, in severe instances, it may not be possible to manufacture a cooktop product.

SUMMARY OF THE DISCLOSURE

The present disclosure is directed to providing a surface type heating element which can be used even at a high operating temperature of 400° C. or more as well as an operating temperature of an electric range cooktop and does not allow the elution of the material during use of an electric range.

The present disclosure is also directed to providing a surface type heating element which has high resistance to thermal shock and the like by having high fracture toughness and, furthermore, is subjected to decreased thermal shock by having a low coefficient of thermal expansion within the range from room temperature to the operating temperature at which the electric range can be used, resulting in improving reliability and lifetime.

In particular, the present disclosure is directed to providing a surface type heating element which ensures conductivity by controlling electrical resistivity and has improved adhesive strength between the surface type heating element and a substrate and/or an insulating layer. To this end, the present disclosure is directed to a surface type heating element whose component has controlled surface passivation properties.

Furthermore, the present disclosure is directed to providing a surface type heating element which allows the material thereof to be prevented from being oxidized due to high temperature in the manufacture thereof.

Meanwhile, the present disclosure is directed to providing a method of manufacturing a surface type heating element, which does not consume a long time and high energy at high temperature during manufacture, so that there is no limitation on a substrate material.

In addition, the present disclosure is directed to providing a method of manufacturing a surface type heating element, which does not require a reducing process atmosphere for preventing the material from being oxidized in an existing method of manufacturing a surface type heating element at a high process temperature.

According to an embodiment of the present disclosure, there is provided a surface type heating element which includes a NiCr alloy and has an oxygen content of 1 to 3 wt %, so that it can be used even at a high operating temperature of 400° C. or more, suppresses the elution of the material itself, has high fracture toughness, a low coefficient of thermal expansion, and heat resistance, and furthermore, ensures conductivity by having improved adhesive strength with respect to a substrate and/or an insulating layer and controlled electrical resistivity.

For example, the surface type heating element provides that the surface type heating element can have an adhesive strength of 25 N or more with respect to a substrate or an insulating layer is provided.

For example, the surface type heating element provides that the surface type heating element can have an electrical resistivity of $10^{-4}$ to $10^{-2}$ Ωcm is provided.

For example, the surface type heating element provides that a Ni content of the NiCr alloy can range from 60 to 95 wt % is provided.

For example, the surface type heating element provides that the substrate can be formed of any one of glass, a glass ceramic, $Al_2O_3$, AlN, polyimide, polyether ether ketone (PEEK), and a ceramic is provided.

For example, the surface type heating element provides that the insulating layer can include any one of boron nitride, aluminum nitride, and silicon nitride is provided.

For example, the surface type heating element provides that the insulating layer can include glass frit as a binder is provided.

For example, the surface type heating element provides that the binder can include a borosilicate component and/or a bentonite component is provided.

According to another embodiment of the present disclosure, there is provided a method of manufacturing a surface type heating element, which includes: providing a substrate; coating the substrate with a surface type heating element layer by applying a surface type heating element paste including a NiCr alloy component and having an oxygen content of 1 to 3 wt % onto the substrate; drying the applied surface type heating element layer; and photonically sintering the dried surface type heating element layer, so that a process time can be shortened, energy consumption can be reduced, an additional atmosphere control to a reducing atmosphere is not essential, and conductivity can be ensured by improving adhesive strength with respect to a substrate and/or an insulating layer and controlling electrical resistivity.

For example, the method of manufacturing a surface type heating element, provides that, before the coating with a surface type heating element layer, forming an insulating layer on the substrate can be further included, is provided.

For example, the method of manufacturing a surface type heating element, provides that the substrate can be formed of any one of glass, a glass ceramic, $Al_2O_3$, AlN, polyimide, polyether ether ketone (PEEK), and a ceramic, is provided.

For example, the method of manufacturing a surface type heating element, provides that the insulating layer can include any one of boron nitride, aluminum nitride, and silicon nitride, is provided.

For example, the method of manufacturing a surface type heating element, provides that the insulating layer can include glass frit as a binder, is provided.

For example, the method of manufacturing a surface type heating element, provides that the binder can include a borosilicate component and/or a bentonite component, is provided.

For example, the method of manufacturing a surface type heating element, provides that the surface type heating element paste can include a vehicle including an organic binder at 20 to 40 wt % and a NiCr alloy powder as the remainder, is provided.

For example, the method of manufacturing a surface type heating element, provides that a Ni content of the NiCr alloy powder can range from 70 to 95 wt %, the NiCr alloy powder can have a particle size of 10 nm to 10 μm, the organic binder can be ethyl cellulose, and a solvent can be butyl carbitol acetate, is provided.

For example, the method of manufacturing a surface type heating element, provides that a total light irradiation intensity in the photonic sintering can range from 40 to 70 J/$cm^2$, is provided.

For example, the method of manufacturing a surface type heating element, provides that the surface type heating element after the photonic sintering can have an electrical resistivity of $10^{-4}$ to $10^{-2}$ Ωcm, is provided.

For example, the method of manufacturing a surface type heating element, provides that an adhesive strength between the substrate and the surface type heating element after the photonic sintering can be 25 N or more, is provided.

Alternatively, the method of manufacturing a surface type heating element, provides that an adhesive strength between the insulating layer and the surface type heating element after the photonic sintering can be 25 N or more, is provided.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF THE EMBODIMENTS

Figure 1:
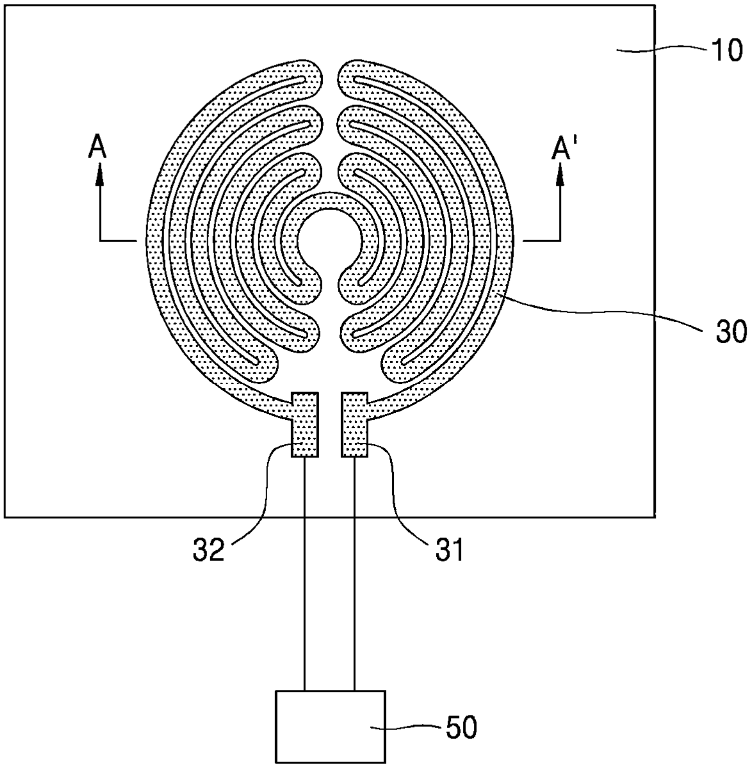
FIG. 1 is a plan view of a surface type heating device according to an embodiment of the present disclosure as viewed from above a substrate.

The above objects, features and advantages of the present disclosure will be described in detail with reference to the accompanying drawings, and therefore, the technical idea of the present disclosure should be easily implemented by those of ordinary skill in the art. In the following description of the present disclosure, when a detailed description on the related art is determined to unnecessarily obscure the subject matter of the present disclosure, the detailed description will be omitted. Hereinafter, exemplary embodiments of the present disclosure will be described in detail with reference to the accompanying drawings. In the drawings, the same reference numerals are used to indicate the same or similar components.

Hereinafter, the disposition of any component disposed on an "upper portion (or lower portion)" of a component or disposed "on (or under)" a component can mean that not only the arbitrary component is disposed in contact with the upper surface (or lower surface) of the component but also another component can be interposed between the component and the arbitrary component disposed on (or under) the component.

In addition, it should be understood that when an element is described as being "connected" or "coupled" to another element, the element can be directly connected or coupled to another element, other elements can be "interposed" between the elements, or each element can be "connected" or "coupled" through other elements.

Hereinafter, a surface type heating element and a manufacturing method thereof according to some embodiments of the present disclosure will be described.

Figure 2:
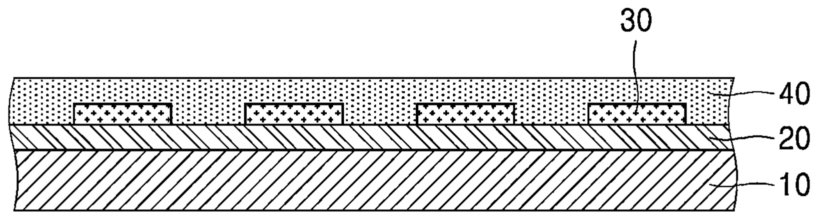
FIG. 2 is an enlarged cross-sectional view illustrating one example of a portion taken along A-A' of the surface type heating device of FIG. 1.
Figure 3:
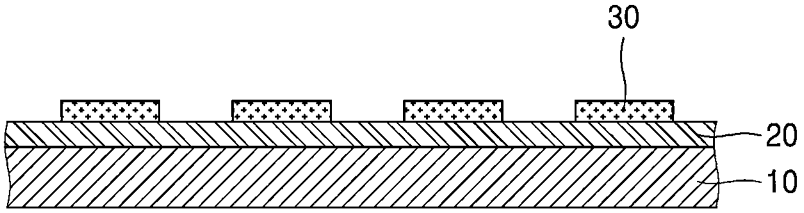
FIG. 3 is an enlarged cross-sectional view illustrating another example of a portion taken along A-A' of the surface type heating device of FIG. 1.

Referring to FIGS. 1 to 3, an electric range 1 according to an embodiment of the present disclosure includes a substrate 10 whose surface is made of an electrically insulating material, an insulating layer 20 disposed on the substrate 10, a surface type heating element layer 30 formed by sintering a predetermined powder containing an oxide powder and disposed on the insulating layer 20 disposed on the substrate 10, and a power supply unit 50 configured to supply electricity to the surface type heating element layer 30. A cover layer 40 can be formed on the surface type heating element layer 30.

In this instance, the substrate 10 can be manufactured in various sizes and shapes according to the needs of a device using the electric range 1. As a non-limiting example, the substrate 10 of the present disclosure can be a plate-shaped member. In addition, the substrate 10 can have a different thickness for each position in the substrate as necessary. Furthermore, the substrate 10 can be bent as necessary.

In the present disclosure, the material forming the substrate 10 is not particularly limited as long as it is an insulating material. As a non-limiting example, the substrate in the present disclosure can be not only a ceramic substrate containing glass, a glass ceramic, alumina ($Al_2O_3$), aluminum nitride (AlN), or the like but also formed of a polymer material such as polyimide (PI) or polyether ether ketone (PEEK). However, the substrate can include any one of glass, a glass ceramic, and a ceramic. This is because these materials are basically able to ensure insulating properties and are advantageous in terms of anti-staining, an anti-fingerprint effect, and visual properties as compared to other materials. Particularly, a glass ceramic can be the most preferred because the glass ceramic can ensure impact resistance and low expandability in addition to the advantages of general amorphous glass, such as transparency and aesthetics, as compared with other ceramic materials.

The insulating layer 20 can be provided on any one of both surfaces of the substrate 10, that is, the surface on which the surface type heating element layer 30 is formed. When the electric range of the embodiment of the present disclosure includes the insulating layer 20, the insulating layer 20 should be formed on an entirety or part of the substrate 10. In this instance, the part of the substrate means at least a portion of the substrate that the user can touch during operation of the electric range and/or a portion in which the surface type heating element layer and the substrate are in contact with each other.

The insulating layer formed on the substrate after being fired can have a thickness of 5 to 100 μm. When the thickness of the insulating layer is less than 5 μm, it is difficult to ensure the electrical stability of the insulating layer. On the other hand, when the thickness of the insulating layer is more than 100 μm, there are problems such as cracks are highly likely to occur due to a difference in material or coefficient of thermal expansion of the insulating layer, the substrate, and the surface type heating element layer, a large amount of materials are consumed, and a process time increases.

The insulating layer 20 can include, as a main component, any one of boron nitride, aluminum nitride, and silicon nitride, which can stably ensure resistivity even at high temperature. All of the components have a common feature which is a ceramic material-based insulators.

Figure 4:
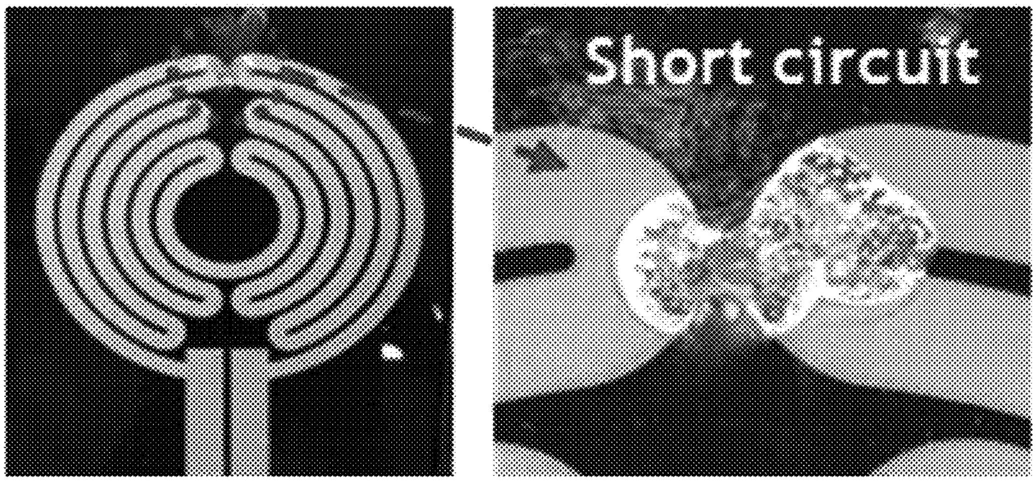
FIG. 4 shows an example in which a heater module is destroyed due to a short circuit occurring in the heating element of the surface type heating element layer due to a decrease in resistivity of a substrate during high-power operation.

When the insulating layer 20 is formed between the substrate 10 and the surface type heating element layer 30, the insulating layer can protect the user from an electric shock occurring due to a back leakage current that can be caused by a decrease in resistivity of the substrate at high temperatures. In addition, the insulating layer 20 prevents a short-circuit current in the surface type heating element layer 30 during high-power operation of the surface type heating element layer 30 due to having relatively high resistivity at high temperature (see FIG. 4). As a result, the surface type heating element layer 30 can be prevented from being destroyed.

In addition, the insulating layer 20 of the embodiment of the present disclosure should ensure adhesion to the substrate 10 and/or the surface type heating element layer 30 and, simultaneously, have high temperature resistivity higher than that of the substrate and compatibility with coating processes such as printing and subsequent processes.

To this end, in the embodiment of the present disclosure, it is more preferable that the insulating layer 20 further includes an inorganic binder. Particularly, in the embodiment of the present disclosure, it is more preferable that the insulating layer 20 can include glass frit as an inorganic binder to reduce a firing temperature. More specifically, in the embodiment of the present disclosure, the insulating layer 20 can include borosilicate as a glass frit. Since the borosilicate has a thermal expansion coefficient of about $50*10^{-7}$ m/° C. which is almost the mean of the thermal expansion coefficients of the substrate 10 and the surface type heating element layer 30 to be described below, it can greatly help to suppress cracking or peeling of the surface type heating element layer 30 due to a difference in coefficient of thermal expansion from the substrate 10.

The electric range of the embodiment of the present disclosure includes the surface type heating element layer 30 on the insulating layer 20 or the substrate 10. In this instance, the heating element of the surface type heating element layer 30 is arranged in a predetermined shape on the substrate 10 or the insulating layer 20 when viewed from above.

As an example referring to FIG. 1, the heating element can be formed on the surface of the insulating layer 20 by extending along a circumference in a zigzag manner while varying a direction based on a semicircle. In this instance, the heating element can be formed continuously from a first terminal unit 31 to a second terminal unit 32 in a predetermined shape.

The surface type heating element layer 30 of the embodiment of the present disclosure includes a NiCr alloy. In the NiCr alloy of the present disclosure, a base material of Ni and Cr is provided as a solute. In this instance, a Cr content in NiCr alloy can range from 5 to 40% by weight (or wt %). When the Cr content in NiCr alloy is less than 5 wt %, corrosion resistance is decreased, and thus the surface type heating element layer can be vulnerable to high temperature or chemicals. On the other hand, when the Cr content is more than 40 wt %, ductility and processability which are characteristics of the face-centered cubic lattice of the Ni are degraded, and furthermore, heat resistance is decreased. As a result, when the electric range is used at high temperature for a long time, the reliability of the electric range can be decreased.

The following Table 1 summarizes the mechanical and electrical properties of the NiCr alloy used to form the surface type heating element layer 30 of the embodiment of the present disclosure and materials for a surface type heating element which are currently being used or known.

TABLE 1

Mechanical/electrical properties of materials for surface type heating element.

| | Fracture toughness ($MPam^{1/2}$) | Coefficient of thermal expansion (m/° C.) | Resistivity (Ω cm) |
|---|---|---|---|
| Ag | 40~105 | $180*10^{-7}$ | $1.6*10^{-6}$ |
| Lanthanum Cobalt Oxide | 0.9~1.2 | $230*10^{-7}$ | $9.0*10^{-3}$ |
| Glass | 0.6~0.9 | $1*10^{-7}$ | — |
| $MoSi_2$ | 6.0 | $65\sim90*10^{-7}$ | $2.7*10^{-5}$ |
| SiC | 4.6 | $40*10^{-7}$ | $1.0*10^{-2}$ |
| NiCr | 110 | $120*10^{-7}$ | $1.4*10^{-4}$ |

As shown in Table 1, first, it can be seen that Ag and NiCr have very high fracture toughness, which is one of the mechanical properties, compared to other ceramic materials due to the inherent ductility and stiffness of metal. When a material for a surface type heating element has high fracture toughness, the material itself has high resistance to thermal shock arising when a surface type heating element is used, and thus the lifetime and reliability of the electric range can be significantly improved.

In addition, it can be seen from Table 1 that the NiCr of the embodiment of the present disclosure has a thermal expansion coefficient lower than that of existing Ag. The coefficient of thermal expansion is one of the important factors that determine thermal shock caused by a thermal change arising when a surface type heating element is used. Therefore, when the NiCr alloy and Ag are exposed to the same temperature change, the NiCr alloy has a thermal expansion coefficient lower than that of Ag and thus is subjected to less thermal shock or thermal stress compared with Ag. In conclusion, the surface type heating element made of the NiCr alloy is subjected to less thermal shock compared with a surface type heating element made of Ag, which is advantageous in terms of the lifetime and reliability of the electric range.

Meanwhile, Table 1 shows electrical resistivity in addition to mechanical properties. Most of the materials that can be used as a material for a surface type heating element have an electrical resistivity of about $10^{-5}$ to $10^{-2}$ Ωcm, as measured at room temperature, except for Ag. When the electrical resistivity of the surface type heating element is more than $10^{-2}$ Ωcm, it is likely that the pattern of the heating element may not be designed due to excessively high resistivity. In addition, when the electrical resistivity is more than $10^{-2}$ Ωcm, the output of the surface type heating element is excessively low, resulting in a low heating temperature, which is unsuitable for use as a cooking appliance. On the other hand, when the electrical resistivity of the surface type heating element is less than $10^{-5}$ Ωcm, the output is very high due to excessively low resistivity, resulting in an excessively high temperature of heat generated by applying an electric current, which is unsuitable in terms of lifetime and reliability.

In view of the above criteria, it can be seen that Ag alone is not suitable for the surface type heating element, whereas the NiCr alloy of the embodiment of the present disclosure can be used alone as well as in combination with other components as the surface type heating element.

Meanwhile, although not shown in Table 1, the materials for the surface type heating element need to have a small change in electrical resistivity according to temperature.

The electrical resistivity of the material generally varies depending on a change in temperature. However, depending on the category of each material type, the behavior of the change in resistivity of the material according to temperature is very different.

For example, in the instance of lanthanum cobalt oxide (LC) or ceramic materials such as $MoSi_2$ and SiC shown in Table 1, electricity is usually transferred by lattice vibration. The lattices constituting the ceramic material vibrate more widely and rapidly as the temperature increases. Therefore, the resistivity of the ceramic material tends to decrease with increasing temperature.

On the other hand, in the instance of metals such as Ag and NiCr shown in Table 1, electricity is transferred by free electron. The lattices constituting the metal also vibrate more widely and rapidly as the temperature increases. However, in the instance of the metal, the transfer of electricity is usually performed by free electrons, and the movement of free electrons is restricted by the vibration of the lattice. Therefore, the lattices of the metal vibrate more rapidly and widely as the temperature increases so as to interfere with the movement of free electrons. As a result, the electrical resistivity of the metal tends to increase with increasing temperature.

The change in electrical resistivity of the NiCr alloy of the embodiment of the present disclosure is very small within 5% of the range from room temperature to the maximum operating temperature at which the electric range can be used. As a result, when the NiCr alloy is used as the surface type heating element of the electric range, an initial inrush current required at the beginning of the operation of the electric range is lowered such that the risk is eliminated, and it is possible to stably operate the electric range without an additional unit such as a triode for alternating current (TRIAC).

On the other hand, when Ag is used as the surface type heating element of the electric range, the excessively low resistivity and high temperature coefficient of resistance of Ag result in the risk of considerably increasing an initial inrush current at the beginning of the operation of the electric range and the disadvantage of requiring a separate unit such as a TRIAC.

In the embodiment of the present disclosure, the surface type heating element layer 30 is thickly applied in the form of a paste on the substrate 10 or the insulating layer 20.

The paste of the present disclosure means a mixture of a vehicle containing essential components such as a solvent, an organic binder, and the like and optional components such as various types of organic additives and particles (powder) of an inorganic substance that is responsible for a main function on the substrate after firing (or sintering).

More specifically, the surface type heating element layer 30 of the embodiment of the present disclosure includes a NiCr alloy powder. The NiCr alloy powder of the embodiment of the present disclosure can have an average particle size (D50) of 10 nm to 10 μm. When the NiCr alloy powder has an average particle size (D50) of less than 10 nm, the surface area of the powder is excessively increased, and the activity of the powder is increased. As a result, the NiCr alloy powder in the form of a paste is not uniformly dispersed. On the other hand, when the NiCr alloy powder has an average particle size (D50) of more than 10 μm, due to an excessively large particle size of the NiCr alloy powder, there is less necking between powder particles, or the powder is not uniformly dispersed. As a result, resistivity is excessively increased, and the adhesion between the surface type heating element layer 30 and the substrate 10 or the insulating layer 20 thereunder is decreased.

The NiCr alloy powder of the present disclosure can be prepared by various methods. As a non-limiting example, the NiCr alloy powder can be prepared by grinding or pulverizing of electrical wires, thermal plasma processing, or the like and can also be prepared by various methods other than the method exemplified above.

In this instance, the NiCr alloy powder can include an oxide layer, which is formed due to passivation, on the surface thereof in a specific composition ratio.

Atoms present on the metal surface inevitably have broken atomic bonds that cannot bind due to the morphological reason of the surface. Atoms located on the surface tend to bond with elements of other components located on the surface due to broken bonds. Therefore, the surface of the metal material including the NiCr alloy of the embodiment of the present disclosure generally has high activity.

Meanwhile, as the size of a particle, that is, powder, is decreased, the proportion of the surface in the same volume of particles is increased. In other words, as the size of powder is decreased, the proportion of the powder surface is increased, and as a result, the activity of the powder becomes increased. Therefore, even in the same atmosphere, as the size of powder is decreased, an oxidation reaction occurs more actively on the powder surface.

When an atmosphere is not specifically controlled, oxygen is the most active gas component in the general atmosphere. Therefore, most of the reactions occurring on the surface of metal particles are the oxidation reaction. As described in the electrical conduction mechanisms of metals and ceramics, metals electrically conduct free electrons, and ceramics such as oxides electrically conduct by lattice vibration or a phonon. However, since free electrons are more effective in conducting electricity than lattice vibration, metals have higher electrical conductivity and lower electrical resistivity compared to ceramics. As a result, when oxidation occurs on the surface of the metal particles, the oxide has electrical resistivity higher than that of the metal, and thus the electrical resistivity of the material increases.

Meanwhile, the surface type heating element of the present disclosure is disposed in the form of a layer on the substrate and/or the insulating layer. In this instance, the surface type heating element layer 30 of the embodiment of the present disclosure is made of a metal material such as NiCr, whereas the substrate and/or the insulating layer is/are mainly made of a ceramic material. Consequently, it is known that the bonding of a metal and a ceramic, which are dissimilar materials, is very difficult. Furthermore, even when the bonding between the surface type heating element layer 30 and the substrate and/or the insulating layer is made, when bonding strength at the interface is not sufficient, peeling and the like occur at the interface. As a result, the insufficient bonding strength at the interface leads to decreases in the reliability and lifetime of a cooktop which is a final product including the surface type heating element.

Therefore, an oxygen content in the surface type heating element layer including the NiCr alloy powder of the embodiment of the present disclosure can range from 1 to 3 wt %.

When the oxygen content in the surface type heating element layer is less than 1 wt %, adhesive strength between the surface type heating element layer made of a metal and the substrate and/or the insulating layer is excessively decreased, and thus it is not possible to form the surface type heating element layer. Also, even when the surface type heating element layer is formed, the reliability or lifetime of a cooktop is decreased due to excessively low adhesive strength between the surface type heating element layer and the substrate and/or the insulating layer. On the other hand, when the oxygen content in the surface type heating element layer is more than 3 wt %, the surface type heating element layer is expanded by excessive oxidization of the surface type heating element layer made of a metal, and thus cracks are generated in the surface type heating element layer, causing the adhesive strength of the surface type heating element layer to be decreased. In addition, the excessive oxidation of the surface type heating element layer made of the NiCr alloy increases the electrical resistivity of the surface type heating element layer, and thus the output of a cooktop which is a final product is decreased.

The oxidation (passivation) of the NiCr alloy powder of the embodiment of the present disclosure can be embodied, as a non-limiting example, by passing the NiCr alloy powder through an oxygen reaction section. More specifically, first, a NiCr alloy powder with a desired composition is prepared through plasma in an inert (Ar or Ar+$N_2$) atmosphere. The prepared NiCr alloy powder is passivated by allowing oxygen to flow in a chamber containing the alloy powder, thereby forming an oxide layer on the surface of the NiCr alloy powder. In this instance, the thickness of the oxide layer formed on the surface of the NiCr alloy powder varies depending on an amount of oxygen introduced into the chamber during the passivation. In general, as the addition amount of oxygen increases, the thickness of the oxide layer formed on the surface of the NiCr alloy powder tends to increase. However, since the Ni-containing oxide layer formed on the surface of the NiCr alloy of the embodiment of the present disclosure has passivation properties, the amount of oxygen added in the oxygen reaction section does not have a simple computable one-dimensional linear relationship with the thickness of the oxide layer formed on the surface of the NiCr alloy powder by the added oxygen or the oxygen content in the surface type heating element layer.

The following Table 2 shows the addition amount of oxygen as measured under a NiCr alloy powder injection rate condition of 1 kg/min in the present disclosure and the oxygen content in the surface type heating element as analyzed via energy dispersive spectrometry (EDS) for a scanning electron microscope (SEM). In this instance, the units of an addition amount of oxygen are standard liter per minute (SLPM). As shown in Table 2, it can be seen that as an amount of oxygen added in an oxygen reaction section increases, an oxygen content in surface type heating element increases in proportion thereto, but an increment in the oxygen content decreases as the addition amount of oxygen increases.

TABLE 2

Addition amount of oxygen and oxygen content in surface type heating element.

| Added oxygen amount (SLPM) | Measured oxygen content (wt %) |
|---|---|
| 0.5 | 1~2 |
| 3 | 4~6 |
| 6 | 6~8 |
| 10 | 8~10 |

Figure 5:
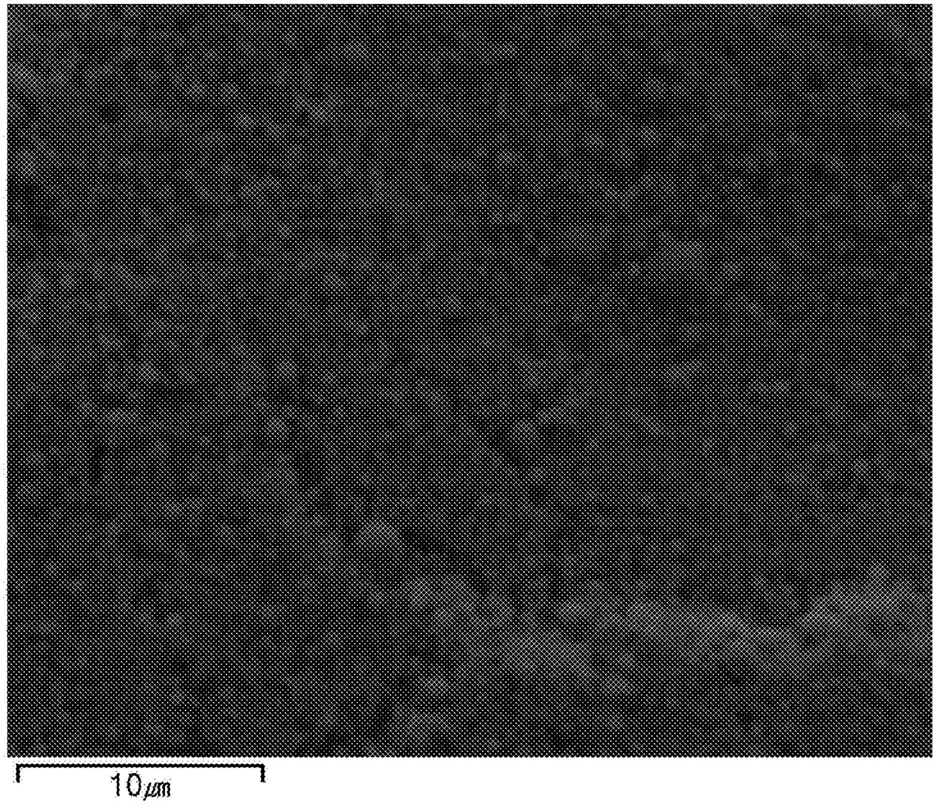
FIG. 5 is a scanning electron microscope (SEM) image of a surface type heating element layer formed using a NiCr alloy powder according to an embodiment of the present disclosure.
Figure 6:
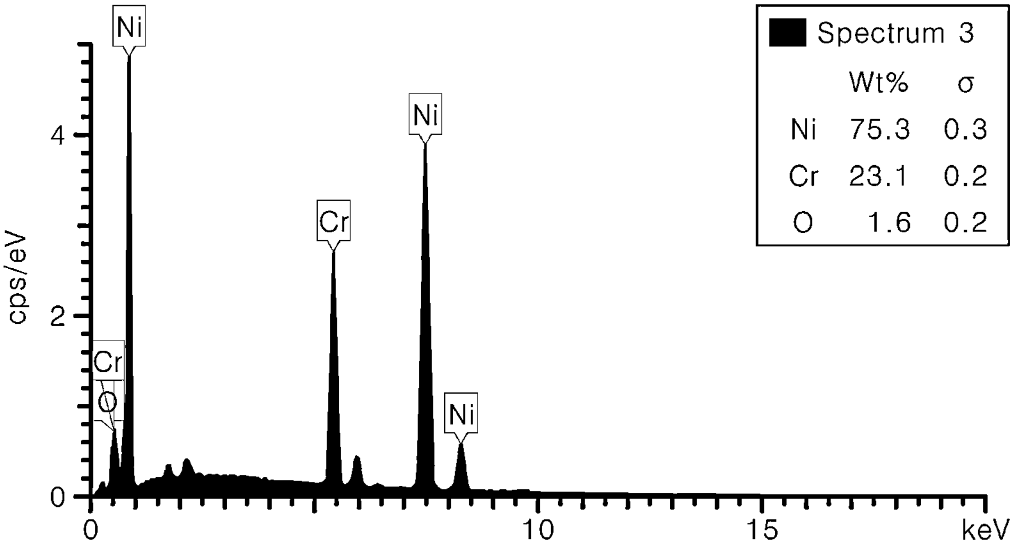
FIG. 6 shows a composition analysis result of the surface type heating element layer of FIG. 5 as measured via energy dispersive spectrometry (EDS) analysis.

FIG. 5 is an SEM image of the surface type heating element layer formed using the NiCr alloy powder according to the embodiment of the present disclosure. FIG. 6 shows a composition analysis result of the surface type heating element layer of FIG. 5 as measured via EDS analysis. The surface type heating element layer formed using the NiCr alloy powder whose surface is oxidized to form a passivation layer according to the embodiment of the present disclosure has no cracks in the surface thereof (see FIG. 5). In addition, the surface type heating element layer formed using the NiCr alloy powder whose surface is oxidized to form a passivation layer according to the embodiment of the present disclosure has a certain oxygen content, and the oxygen content in the surface type heating element layer can be quantitatively measured via EDS (see FIG. 6).

The NiCr alloy powder of the present disclosure is included together with the vehicle in the paste. More specifically, the paste of the embodiment of the present disclosure includes the vehicle including an organic binder at 20 to 40 wt % and the NiCr alloy powder as the reminder.

The NiCr alloy powder applied in the paste for forming the surface type heating element layer 30 of the present disclosure determines the electrical properties and mechanical properties of the surface type heating element layer 30. The NiCr alloy powder determines the performance of the electric range including the surface type heating element by determining the resistivity of the final surface type heating element layer 30. Furthermore, the NiCr alloy powder greatly affects the lifetime and reliability of the electric range by determining the fracture toughness and adhesive strength of the surface type heating element layer 30.

In particular, as described above, the degree of oxidation of the NiCr alloy powder determines an oxygen content in the final surface type heating element layer, and the oxygen content determines whether the formation of the surface type heating element layer is possible and controls electrical resistivity and adhesive strength.

Among the paste components, the organic binder functions to mix and disperse NiCr powder and affects the fluidity of the paste and stability of a coating film when the paste is applied using screen printing or the like. In addition, the organic binder also functions as a reducing agent to prevent undesired additional oxidation of NiCr powder during a firing (or sintering) process after the paste coating.

The organic binder of the present disclosure can include a thermoplastic resin and/or a thermosetting resin. As a specific and non-limiting example, the organic binder can be at least one or two selected from polyvinylidene fluoride (PVDF), polymethyl methacrylate (PMMA), a self-cross-linking acrylic resin emulsion, hydroxyethyl cellulose, ethyl hydroxyethyl cellulose, carboxymethyl cellulose, hydroxy cellulose, methyl cellulose, nitrocellulose, ethyl cellulose, styrene-butadiene rubber (SBR), a copolymer of C1-C10 alkyl (meth)acrylate and unsaturated carboxylic acid, gelatin, thixoton, starch, polystyrene, polyurethane, a resin including a carboxyl group, a phenolic resin, a mixture of ethyl cellulose and a phenolic resin, an ester polymer, a methacrylate polymer, a self-crosslinking (meth)acrylic acid copolymer, a copolymer having an ethylenically unsaturated group, an ethyl cellulose-based binder, an acrylate-based binder, an epoxy resin-based binder, and a mixture thereof. Particularly, glucose, ascorbic acid, polyvinylpyrrolidone (PVP), and the like are preferred because they also function as a reducing agent to prevent undesired additional oxidation of NiCr powder during a firing (or sintering) process as described above.

When the content of the organic binder is less than 20 wt %, adhesion between NiCr powder particles is decreased when coating the surface type heating element, and thus it is difficult to stably maintain the coating film. In severe instances, after being coated and dried, the coating film can be cracked or broken. On the other hand, when the content of the organic binder is more than 40 wt %, there can be a problem of mechanical stability, that is, a difficulty in maintaining the morphology of the coating film, due to high fluidity, and the thickness of the final surface type heating element layer 30 can be excessively decreased.

A solvent included in the paste can have high volatility sufficient to be evaporated even when a relatively low level of heat is applied under atmospheric pressure while ensuring complete dissolution of the organic substance in the paste, particularly, the polymer. In addition, the solvent should boil well at a temperature below the decomposition temperature or boiling point of any other additives contained in the organic medium. That is, a solvent having a boiling point of less than 150° C., as measured at atmospheric pressure, is most commonly used.

The solvent of the present disclosure is selected according to the type of organic binder. As the solvent, aromatic hydrocarbons, ethers, ketones, lactones, ether alcohols, esters, diesters, or the like can be generally used. As a non-limiting example, such a solvent includes butyl carbitol, butyl carbitol acetate, acetone, xylene, methanol, ethanol, isopropanol, methyl ethyl ketone, ethyl acetate, 1,1,1-trichloroethane, tetrachloroethylene, amyl acetate, 2,2,4-triethyl pentanediol-1,3-monoisobutyrate, toluene, methylene chloride, and fluorocarbon. In this instance, the solvent can be used alone or in combination of two or more. Particularly, a solvent mixed with other solvents is preferred for complete dissolution of the polymer binder.

When the content of the solvent is less than 5 wt %, the paste does not have sufficient fluidity, and thus it is difficult to form the surface type heating element layer 30 by a coating method such as screen printing. On the other hand, when the content of the solvent is more than 15 wt %, the paste has high fluidity, and thus the mechanical stability of the coating film is decreased.

The paste of the present disclosure can include, as an additive, for example, a plasticizer, a releasing agent, a dispersing agent, a remover, an antifoaming agent, a stabilizer, a wetting agent, and the like.

When a dispersing agent is included as the additive, the dispersing agent can be at least one or two selected from: low molecular weight anionic compounds such as fatty acid salts (soap), α-sulfo fatty acid ester salts (MES), alkylbenzene sulfonate (ABS), linear alkylbenzene sulfonate (LAS), alkyl sulfate (AS), alkyl ether sulfate (AES), alkyl sulfuric acid triethanol, and the like; low molecular weight non-ionic compounds such as fatty acid ethanolamide, polyoxyalkylene alkyl ether (AE), polyoxyalkylene alkyl phenyl ether (APE), sorbitol, sorbitan, and the like; low molecular weight cationic compounds such as alkyl trimethyl ammonium salts, dialkyl dimethyl ammonium chloride, alkylpyridinium chloride, and the like; low molecular weight amphoteric compounds such as alkyl carboxyl betaine, sulfobetaine, lecithin, and the like; aqueous polymer dispersing agents such as a formalin condensate of naphthalene sulfonate, polystyrene sulfonate, polyacrylate, a salt of a copolymer of a vinyl compound and a carboxylic acid-based monomer, carboxy methylcellulose, polyvinyl alcohol, and the like; non-aqueous polymer dispersing agents such as polyacrylic acid partial alkyl ester, polyalkylene polyamine, and the like; and cationic polymer dispersing agents such as polyethyleneimine, an aminoalkylmethacrylate copolymer, and the like. As a non-limiting example, a phosphoric acid-based dispersing agent and the like can be added to uniformly disperse NiCr powder.

The paste for forming the surface type heating element layer 30 of the present disclosure is applied onto the surface of the substrate or the insulating layer after being prepared. The paste can be prepared by mixing the NiCr alloy powder with a controlled oxygen content, the organic solvent, the organic binder, and the additive using a mixer and a three-roll mill at 10 to 30° C. for 2 to 6 hours. A non-limiting example of the coating method includes a screen printing method in which the paste is applied using a screen printer. An another example includes a green sheet method in which the surface type heating element layer is formed by casting the paste on an additional flexible substrate, removing a volatile solvent while heating the cast layer to form a green tape, and laminating the tape on the substrate using a roller.

After the coating step, drying the applied paste for the surface type heating element layer 30 at a predetermined temperature is performed. The drying step is typically performed at 200° C. or less which is a relatively low temperature. In the drying step, the solvent is mainly evaporated.

After the drying step, the surface type heating element layer 30 can be formed by a firing process such as a sintering process.

In a conventional process of manufacturing a surface type heating element, long-term high temperature thermal treatment is performed to fire components having a high melting point, such as metal alloys and ceramics. The long-term high temperature thermal treatment requires an isolated system such as internal insulation. Furthermore, the surface type heating element can be contaminated by contaminants in the long-term high temperature atmosphere so as to damage the surface type heating element. In addition, since the insulating layer 20 and/or the substrate 10 thereunder is/are also exposed to the long-term high temperature atmosphere, the materials that can be used as the insulating layer 20 and the substrate 10 are highly limited, and it is highly likely that the insulating layer 20 and the substrate 10 are contaminated.

On the other hand, in the method of manufacturing a surface type heating element of the present disclosure, a thermal treatment method which does not require long-term high temperature thermal treatment is applied to fire the surface type heating element layer 30. To this end, a photonic sintering process using intense pulsed white light is applied in the method of manufacturing a surface type heating element of the present disclosure.

As a non-limiting example of intense pulsed white light in the present disclosure, intense pulsed white light emitted from a xenon lamp can be used. When the dried paste for the surface type heating element is irradiated with intense pulsed white light, the paste is sintered by radiant energy of intense pulsed white light, and thereby the surface type heating element can be formed.

More specifically, when the dried paste is irradiated with intense pulsed white light, first, the organic substances, especially, the binder, present in the paste are burned out. In the preceding drying step, the solvent among organic vehicle components constituting the paste is mainly volatilized. Therefore, after the drying step, the binder among the organic vehicle components serves to bind solid powder components in the dried paste, and thus the mechanical strength of the dried paste can be maintained. Afterwards, the organic binder is eliminated by radiant energy of radiated intense pulsed white light at an initial stage of photonic sintering, and this phenomenon or step is referred to as binder burnout.

After the binder burnout, most of the organic vehicle components are no longer present in the paste. Accordingly, the remaining powder components are sintered by irradiation with intense pulsed white light, and thereby the final surface type heating element layer 30 is formed. In this instance, the NiCr alloy powder which is a powder component is sintered by the intense pulsed white light to form necks between individual powder particles, and thus the macroscopic resistivity of the surface type heating element layer 30 can be reduced.

Figure 7:
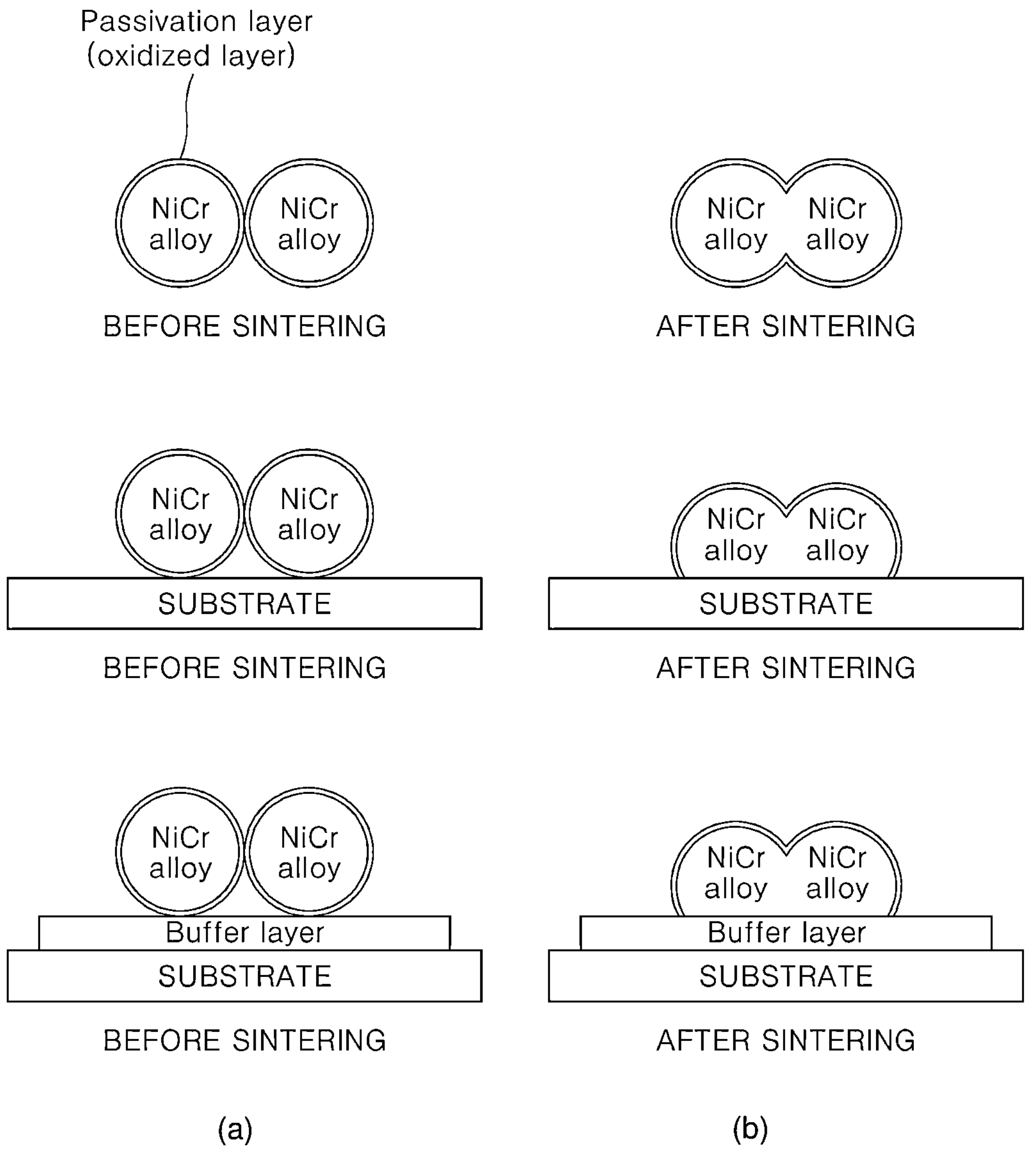
FIG. 7 is a schematic diagram illustrating the NiCr alloy powder in a particle state, in an applied state on a substrate or an insulating layer, and in a sintered state, and a passivation oxide layer formed on the surface of the powder.

FIG. 7 is a schematic diagram illustrating the NiCr alloy powder in a particle state ((a) of FIG. 7), in an applied state on a substrate or an insulating layer, and in a sintered state ((b) of FIG. 7), and the passivation oxide layer formed on the surface of the powder. First, before the NiCr alloy powder of the embodiment of the present disclosure is sintered, all of the NiCr alloy powder is in a state in which necks between powder particles are not formed. In other words, in the instance of the NiCr alloy powder before sintering, individual particles, whether in a particle state, an applied state on a substrate, or an applied state on an insulating layer, are physically connected to each other. Therefore, the layer made of the NiCr alloy powder before sintering has electrical resistivity that is too high for use as the surface type heating element layer and also has very low adhesive strength with respect to other layers.

On the other hand, after being sintered, the NiCr alloy powder of the embodiment of the present disclosure is in a state in which necks between powder particles are formed. The necks are formed regardless of the presence or absence of a passivation oxide layer on the surface of the NiCr alloy powder. Since the NiCr alloy powder in a particle state are connected to each other due to the necks, the electrical resistivity of the surface type heating element layer can be decreased to within the range applicable to a cooktop. Meanwhile, when the NiCr alloy powder is formed on the substrate or the insulating layer, the alloy powder and the substrate or the insulating layer are chemically bonded by the passivation oxide layer formed on the surface of the NiCr alloy powder, and as a result, the surface type heating element layer of the present disclosure can have adhesive strength sufficient to ensure the lifetime and reliability of a cooktop. In particular, since the passivation oxide layer formed on the surface of the NiCr alloy powder of the present disclosure is very thin, it is possible to form the necks despite the high melting point of the oxides constituting the passivation oxide layer.

Furthermore, the NiCr alloy powder of the embodiment of the present disclosure is no longer oxidized by the photonic sintering process of the present disclosure because the photonic sintering process of the present disclosure does not require long-term high temperature thermal treatment unlike conventional thermal sintering. In addition, although the NiCr alloy powder of the embodiment of the present disclosure has a relatively large proportion of surface area and a small powder shape, additional oxidation of the NiCr alloy powder is suppressed because a reducing atmosphere can be produced by the organic binder and the like in the paste, and the passivation oxide layer formed on the powder surface can rather be partially reduced. Therefore, due to the reducing atmosphere caused by the organic binder, the passivation oxide layer formed on the surface of the NiCr alloy powder of the embodiment of the present disclosure no longer grows and is partially reduced, resulting in the formation of necks.

A total light irradiation intensity in the photonic sintering process of the present disclosure can range from 40 to 70 J/cm$^2$. When the total light irradiation intensity is less than 40 J/cm$^2$, it is difficult to form necks between NiCr powder particles and thus form coupling between NiCr powder particles, resulting in excessively high resistivity of the surface type heating element layer 30. On the other hand, when the total light irradiation intensity is more than 70 J/cm$^2$, NiCr particles are oxidized due to an excessively high light irradiation intensity, and the oxide layer formed on the surface of NiCr particles causes the resistivity of the surface type heating element layer 30 to be excessively increased.

Meanwhile, the photonic sintering process of the present disclosure can be operated with 1 to 30 pulses during the entire photonic sintering process. A pulse duration (or pulse on time) can range from 1 to 40 ms, and a pulse interval (or pulse off time) can range from 1 to 500 ms.

The surface type heating element layer 30 which has been finally sintered through the photonic sintering process of the present disclosure can have a thickness of 1 to 100 μm. When the thickness of the surface type heating element layer 30 is less than 1 μm, it is difficult to ensure a dimensionally stable surface type heating element layer, and the thermal stability and mechanical stability of the surface type heating element layer 30 are decreased due to local heating. On the other hand, when the thickness of the surface type heating element layer 30 is more than 100 μm, there are problems in which cracks are highly likely to occur due to a difference in material or thermal expansion coefficient from the substrate and the insulating layer, and a process time increases.

Meanwhile, the surface type heating element layer 30 using the NiCr alloy powder of the present disclosure can have an electrical resistivity of $10^{-4}$ to $10^{-2}$ Ωcm. When the electrical resistivity of the surface type heating element is more than $10^{-2}$ Ωcm, the output of the surface type heating element is decreased due to excessively high resistivity. Therefore, the thickness of the surface type heating element should be increased to lower the resistivity of the surface type heating element, but an increase in the thickness of the surface type heating element also affects the coefficient of thermal expansion of the surface type heating element, and thus the stability of the surface type heating element is significantly decreased. On the other hand, when the electrical resistivity of the surface type heating element is less than $10^{-4}$ Ωcm, a current exceeding an allowable current flows due to excessively low resistivity, and thus the output of the surface type heating element is excessively increased. Therefore, in order to lower the resistivity of the surface type heating element, terminal resistance should be increased by reducing the thickness, but the excessively thin thickness of the surface type heating element also causes the heat resistance of the surface type heating element to be decreased.

In addition, the surface type heating element layer 30 of the present disclosure can have an adhesive strength of 25 N or more with respect to the substrate 10 or the insulating layer 20 thereunder. There is no upper limit of the adhesive strength of the surface type heating element layer 30 of the present disclosure. However, when the adhesive strength is less than 25 N, cracks are generated in the surface type heating element layer 30, and the surface type heating element layer 30 is also detached or destroyed due to excessively low adhesive strength, causing the lifetime and reliability of the electric range to be decreased.

EXAMPLES

In an example of the present disclosure, a paste for a surface type heating element, which included a NiCr alloy powder, an ethyl cellulose or methyl cellulose binder with an average molecular weight of about 100, a butyl carbitol acetate solvent, and a phosphoric acid-based dispersing agent, was applied through screen printing for a surface type heating element layer coating, then dried, and photonically sintered, thereby manufacturing a surface type heating element layer 30.

Adhesive strength of the surface type heating element layer 30 of the present disclosure was measured using a RST3 model scratch tester commercially available from Anton Paar GmbH. This tester measures adhesive strength while increasing a load from 0 to 30 N, and, in this instance, adhesive strength was measured under the condition that the scratch length of the tip was 5 mm.

Meanwhile, the oxygen content in the surface type heating element layer 30 of the present disclosure was measured using an EDS system commercially available from TESCAN ORSAY HOLDING. at an accelerating voltage of 5 to 30 kV and 100 to 150,000× magnification.

First, under the process conditions of the example, that is, a total light irradiation intensity ranging from 40 to 70 J/cm$^2$, both electrical resistivity and adhesive strength were measured to satisfy the requirements of the surface type heating element of the present disclosure.

On the other hand, when the total light irradiation intensity is less than 40 J/cm$^2$, the NiCr alloy powder was not properly sintered. As a result, necks between NiCr alloy powder particles were not properly formed, and thus the electrical resistivity and adhesive strength of the surface type heating element layer 30 did not satisfy their specifications.

Meanwhile, as the total light irradiation intensity increases, the NiCr alloy powder was more sufficiently sintered and thus further densified. As a result, as the light irradiation intensity increases, a sintering shrinkage rate increased, and thus necks between NiCr alloy powder particles were properly formed. Therefore, both electrical resistivity and adhesive strength satisfying the specifications were measured.

FIGS. 8 to 11 show results of measuring adhesive strength in experimental examples in which oxygen contents in the surface type heating element layers 30 of the present disclosure are measured to be 0 wt %, 1 wt %, 4 wt %, and 8 wt %, respectively. In this instance, the measured adhesive strength was determined by the minimum load at which the formed surface type heating element layer 30 began to be detached by the tip to which the load was applied. In addition, the microstructures shown in the upper portion of FIGS. 8 to 11 show that the surface type heating element layer 30 was detached or destroyed at a load equal to or more than adhesive strength.

Figure 8:
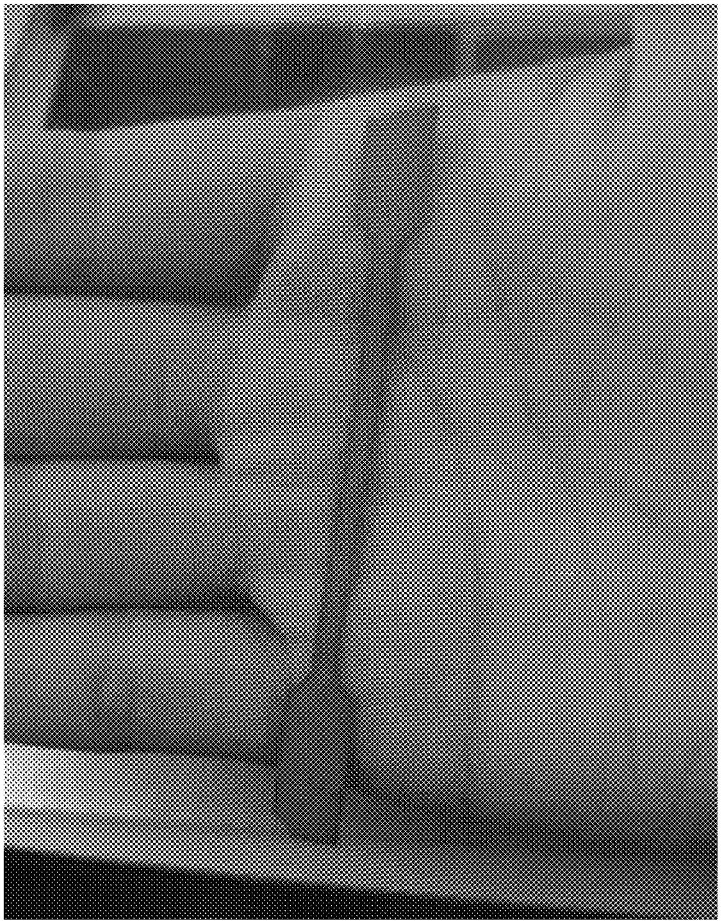
FIG. 8 shows a result of measuring the adhesive strength of a surface type heating element layer whose oxygen content is measured to be 0 wt %.

First, in the instance of an experimental example in which an oxygen content in the surface type heating element layer 30 was 0 wt %, a passivation oxide layer was not formed on the surface of the NiCr alloy powder constituting the surface type heating element. As shown in FIG. 8, the surface type heating element layer having an oxygen content of 0 wt % was not attached to the substrate and/or the insulating layer but promptly detached, and thus manufacturing thereof was not possible.

Figure 9:
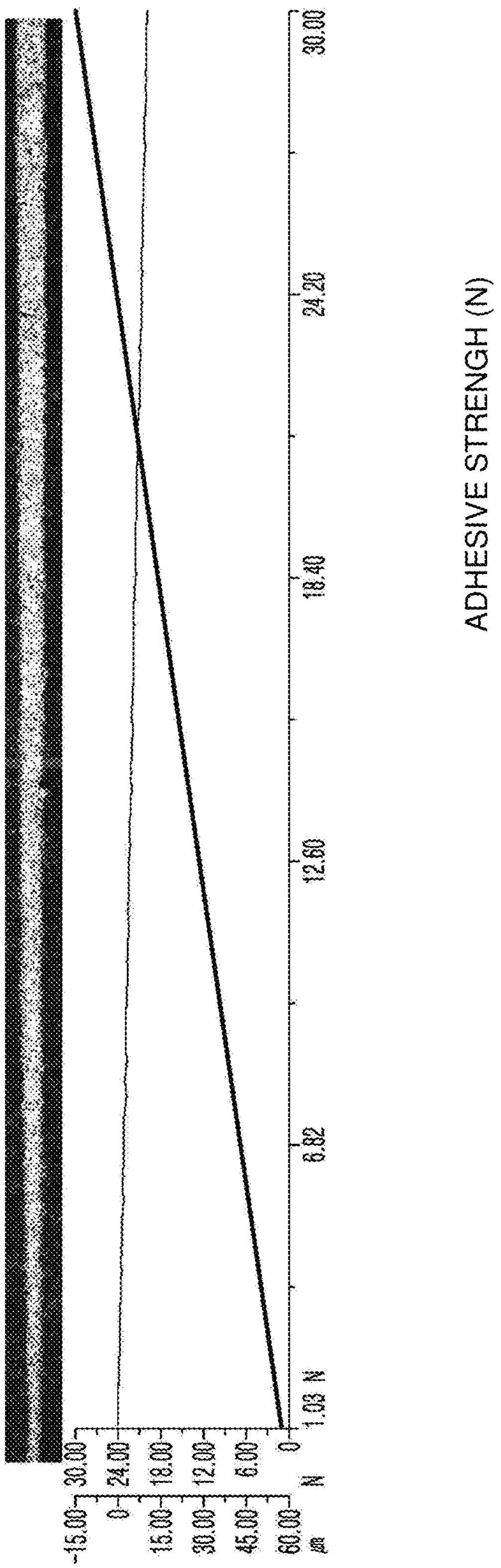
FIG. 9 shows a result of measuring the adhesive strength of a surface type heating element layer whose oxygen content is measured to be 1 wt %.

On the other hand, in the instance of an example in which an oxygen content in the surface type heating element layer 30 was 1 wt %, as shown in FIG. 9, the surface type heating element layer was not detached but attached even at a load of 30 N which is the maximum load of the adhesive strength tester. In this instance, the surface type heating element layer of the example, in which an oxygen content was 1 wt %, was measured to have an electrical resistivity of about $2.5*10^{-4}$ Ωcm which is a range capable of ensuring stable output even at a high temperature of 400° C. or more in a cooktop.

Figure 10:
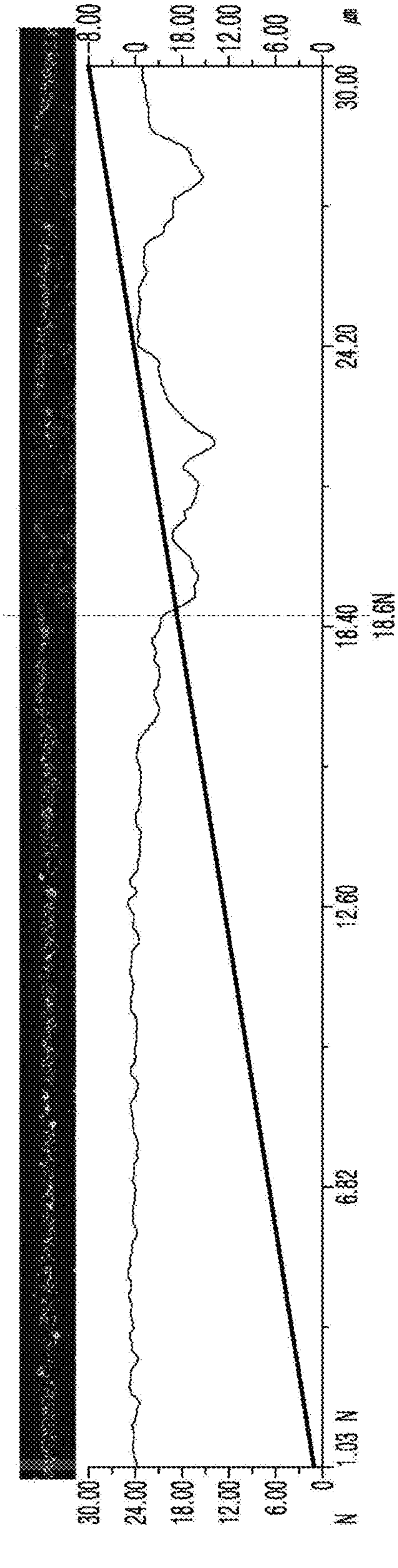
FIG. 10 shows a result of measuring the adhesive strength of a surface type heating element layer whose oxygen content is measured to be 4 wt %.
Figure 11:
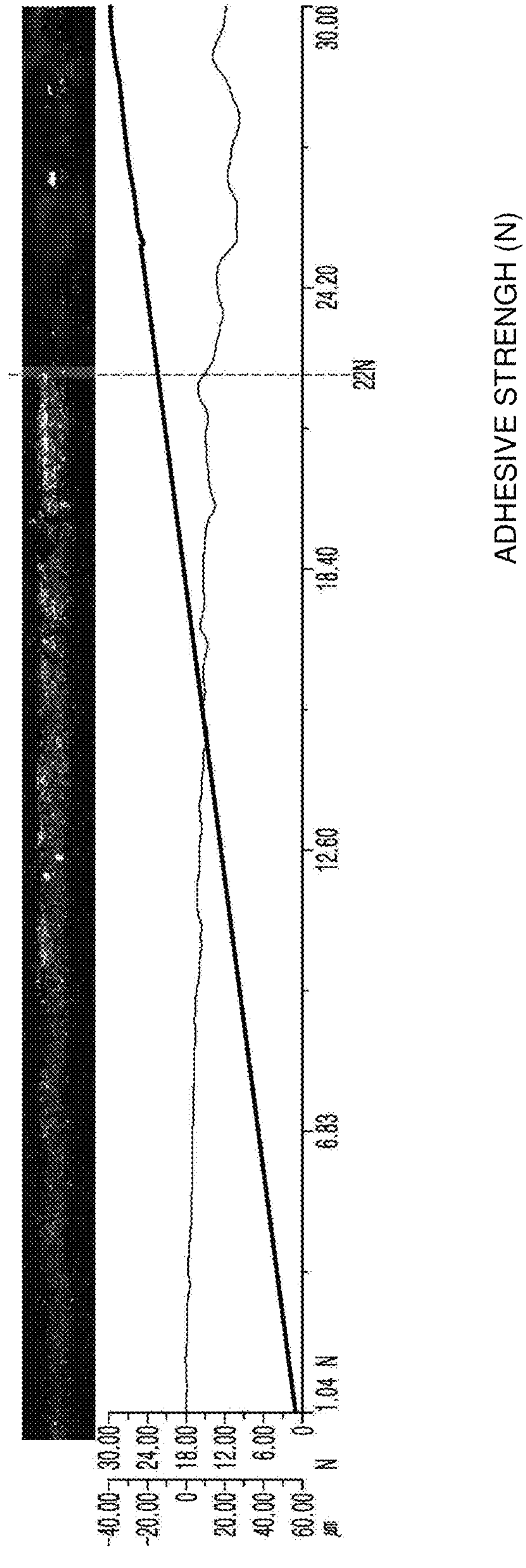
FIG. 11 shows a result of measuring the adhesive strength of a surface type heating element layer whose oxygen content is measured to be 8 wt %.

Meanwhile, in the instance of experimental examples in which the oxygen contents in the surface type heating element layers 30 were 4 and 8 wt %, as shown in FIGS. 10 and 11, the adhesive strengths thereof were decreased and measured to be 18.6 N and 22 N, respectively. In addition, all of electrical resistivities measured in the experimental examples were equal to or more than $1.0*10^{-2}$ Ωcm, and thus it can be seen that the surface type heating element layers of the experimental examples had low high-temperature output in application to the cooktop.

Figure 12:
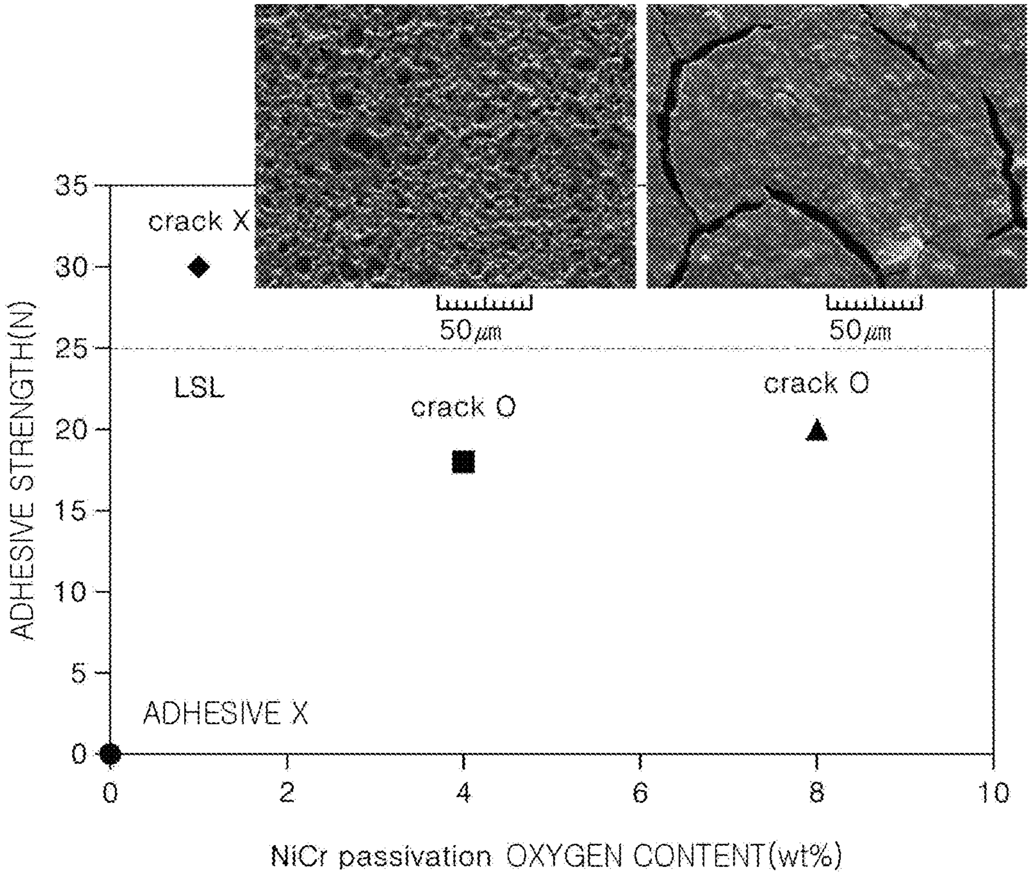
FIG. 12 shows the adhesive strength of a surface type heating element layer including a NiCr alloy of the present disclosure according to an oxygen content and the surface images of the surface type heating element layer.

FIG. 12 shows the adhesive strength of the surface type heating element layer 30 including the NiCr alloy of the present disclosure according to an oxygen content and the surface images of the surface type heating element layer 30. In this instance, as described in FIG. 9 above, an adhesive strength of 30 N measured when an oxygen content is 1 wt % in FIG. 12 does not mean that the measured adhesive strength is 30 N but that the surface type heating element layer is not peeled off or destroyed even at a load of 30 N which is the maximum load of the adhesive strength tester. Therefore, the adhesive strength measured in the example of the present disclosure, in which an oxygen content was 1 wt %, was at least 30 N.

First, as shown in FIGS. 8 and 12, the surface type heating element layer of the experimental example, in which an oxygen content was 0 wt %, exhibited an adhesive strength of 0 N, and thus it was not possible to form the surface type heating element layer on the substrate and/or the insulating layer.

Meanwhile, as shown in FIG. 12, it can be seen that the surface type heating element layers 30 of the experimental examples, in which oxygen contents were 4 and 8 wt %, exhibited an adhesive strength lower than 25 N which was a lower specification limit (LSL), and cracks were generated in the formed surface type heating element layer 30. These cracks significantly decrease the lifetime and reliability of a cooktop to which the surface type heating element is applied.

According to the present disclosure, a surface type heating element designed using a metal component having a high melting point is provided, so that the operating temperature of an electric range to which the surface type heating element is applied can further increase, and furthermore, the reliability of a cooktop product can be improved by preventing the elution of the metal component at high temperature.

In addition, the surface type heating element according to the present disclosure is designed to have both inherent high fracture toughness of the metal and a relatively low coefficient of thermal expansion compared to other metals, so that not only resistance to thermal shock, which is caused by a difference in temperature between the high operating temperature and room temperature and a difference in coefficient of thermal expansion between the surface type heating element and the substrate or the insulating layer thereunder which are generated during use of a cooktop, can be ensured, but also thermal shock itself can be reduced. As a result, the present disclosure can provide an effect of significantly improving the lifetime and reliability of a cooktop such as an electric range.

In addition, since the surface type heating element of the present disclosure includes a metal having a low temperature coefficient of resistance which indicates a change in resistance value according to temperature, an initial inrush current required at the beginning of the operation of a cooktop is lowered, and thus a user's safety against an overcurrent can be ensured. Furthermore, a control unit such as a triode for alternating current (TRIAC) need not be required.

Additionally, the metal material of the surface type heating element of the present disclosure can be used alone as the surface type heating element without mixing with other metals or ceramic powder because the material itself has a resistance value higher than that of other metals. Therefore, the surface type heating element of the present disclosure can exhibit improved reactivity with other materials and improved stability and storability of a paste and also achieve a cost reduction effect in terms of material costs.

Furthermore, the surface type heating element of the present disclosure can achieve an effect of improving the adhesive strength between the surface type heating element and the substrate and/or the insulating layer by including a passivation oxide layer formed on the surface of the metal compound constituting the surface type heating element. In addition, the surface type heating element of the present disclosure can achieve an effect of ensuring the output of a cooktop even at a high temperature of 400° C. or more by controlling the electrical resistivity of the surface type heating element by adjusting an oxygen content in the surface type heating element.

Meanwhile, a method of manufacturing a surface type heating element according to the present disclosure employs a photonic sintering method, and thus it is possible for a long-term high temperature thermal treatment process to not be performed when compared with a conventional thermal sintering method. Therefore, the manufacturing method of the present disclosure can ensure a degree of freedom in design in selecting the materials of a substrate and/or an insulating layer by excluding a long-term high temperature process.

In addition, the method of manufacturing a surface type heating element of the present disclosure can provide a surface type heating element with higher quality by fundamentally excluding contamination of materials, which can occur from a thermal insulation system in long-term high temperature thermal treatment.

Meanwhile, the method of manufacturing a surface type heating element of the present disclosure essentially eliminates the need for a thermal insulation system required for high temperature thermal treatment and, furthermore, does not require an additional facility for producing a reducing process atmosphere, and thus the process facility can be simplified. In addition, the photonic sintering method in the present disclosure reduces the tact time of the entire process by shortening the unit process time and thus can achieve a productivity improvement effect.

Although the present disclosure has been described above with reference to the illustrated drawings, it is obvious that the present disclosure is not limited to the embodiments and drawings disclosed herein, and various modifications can be made by those skilled in the art within the spirit and scope of the present disclosure. In addition, even when the effect of the configuration of the present disclosure is not explicitly described while the above-described embodiments of the present disclosure are described, it is obvious that the effect predictable by the corresponding configuration should also be recognized.

What is claimed is:

1. A surface type heating element comprising:

a surface type heating element layer comprising:

NiCr alloy powders;

necks between powder particles of the NiCr alloy powders;

passivation oxide layers formed on a surface of the NiCr alloy powders; and oxygen in an amount of about 1 wt % to about 3 wt % of the surface type heating element layer.

2. The surface type heating element of claim 1, wherein an adhesive strength of the surface type heating element is about 25 N or more with respect to a substrate or an insulating layer upon which the surface type heating element is located.

3. The surface type heating element of claim 2, wherein the substrate includes any one of glass, a glass ceramic, $Al_2O_3$, AlN, polyimide, polyether ether ketone (PEEK), and a ceramic.

4. The surface type heating element of claim 2, wherein the insulating layer includes any one of boron nitride, aluminum nitride, and silicon nitride.

5. The surface type heating element of claim 4, wherein the insulating layer includes a glass frit as a binder.

6. The surface type heating element of claim 5, wherein the glass frit includes at least one of a borosilicate component and a bentonite component.

7. The surface type heating element of claim 1, wherein an electrical resistivity of the surface type heating element is about $10^{-4}$ to about $10^{-2}$ Ωcm.

8. The surface type heating element of claim 1, wherein a Ni content of the NiCr alloy powders ranges from about 60 wt % to about 95 wt % of the surface type heating element.

9. The surface type heating element of claim 1, wherein a thickness of the passivation oxide layer formed on the surface of the NiCr alloy powder is based on the amount of oxygen.

10. The surface type heating element of claim 1, wherein the passivation oxide layers are further formed at the necks between the powder particles of the NiCr alloy powders.

* * * * *